United States Patent
Cho et al.

(10) Patent No.: US 9,716,397 B2
(45) Date of Patent: Jul. 25, 2017

(54) APPARATUS AND METHOD FOR MAINTAINING CHARGE AMOUNT OF SECONDARY BATTERY

(71) Applicant: LG CHEM, LTD., Seoul (KR)

(72) Inventors: Young-Bo Cho, Daejeon (KR); Tae-Shin Cho, Daejeon (KR); Seoung-Mun Baek, Daejeon (KR); Dae-Sik Chung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 210 days.

(21) Appl. No.: 14/439,495

(22) PCT Filed: Jan. 24, 2014

(86) PCT No.: PCT/KR2014/000718
§ 371 (c)(1),
(2) Date: Apr. 29, 2015

(87) PCT Pub. No.: WO2015/056846
PCT Pub. Date: Apr. 23, 2015

(65) Prior Publication Data
US 2015/0288198 A1    Oct. 8, 2015

(30) Foreign Application Priority Data

Oct. 14, 2013  (KR) .................. 10-2013-0122081
Jan. 10, 2014  (KR) .................. 10-2014-0003525

(51) Int. Cl.
| | | |
|---|---|---|
| H01M 10/44 | (2006.01) | |
| H01M 10/46 | (2006.01) | |
| H02J 7/00 | (2006.01) | |
| H02J 7/04 | (2006.01) | |

(52) U.S. Cl.
CPC .............. *H02J 7/007* (2013.01); *H02J 7/00* (2013.01); *H02J 7/0057* (2013.01); *H02J 7/0063* (2013.01); *H02J 7/0073* (2013.01); *H02J 7/042* (2013.01); *H02J 2007/0067* (2013.01)

(58) Field of Classification Search
CPC ... H02J 2007/005; H02J 7/0021; H02J 7/0047
USPC .................. 320/107, 116, 132, 149
See application file for complete search history.

(56) References Cited

U.S. PATENT DOCUMENTS

| | | |
|---|---|---|
| 6,661,200 B2 | 12/2003 | Odaohhara |
| 2006/0164042 A1 | 7/2006 | Sim |
| 2007/0024246 A1 | 2/2007 | Flaugher |
| 2010/0321025 A1 | 12/2010 | Lin et al. |
| 2011/0089905 A1 | 4/2011 | Yano |
| 2011/0313613 A1 | 12/2011 | Kawahara et al. |
| 2013/0300373 A1* | 11/2013 | Vivanco-Sarabia et al. ............. H02J 7/0014 320/134 |
| 2014/0266222 A1* | 9/2014 | Baughman ........... H02J 7/0021 324/426 |

FOREIGN PATENT DOCUMENTS

| | | |
|---|---|---|
| CN | 1811482 A | 8/2006 |
| CN | 202997585 U | 6/2013 |
| JP | 11-174134 A | 7/1999 |
| JP | 2001-314040 A | 11/2001 |
| JP | 2002-233074 A | 8/2002 |
| JP | 2007-306670 A | 11/2007 |
| JP | 2010-130798 A | 6/2010 |
| JP | 2011-087428 A | 4/2011 |
| KR | 2002-0049256 A | 6/2002 |
| KR | 10-2010-0129141 A | 12/2010 |
| KR | 10-2011-0134803 A | 12/2011 |
| KR | 10-2012-0016767 A | 2/2012 |
| TW | 200945726 A | 11/2009 |

OTHER PUBLICATIONS

International Search Report issued in PCT/KR2014/000718, mailed on Jul. 10, 2014.

* cited by examiner

*Primary Examiner* — Edward Tso
(74) *Attorney, Agent, or Firm* — Birch, Stewart, Kolasch & Birch, LLP (57) ABSTRACT

The present disclosure discloses an apparatus and method for maintaining a charge amount of a secondary battery. The present disclosure reduces a charge amount or increases a discharge amount when a larger charge amount than a required proper charge amount is charged in the secondary battery. Also, the present disclosure reduces a discharge amount or increases a charge amount when a smaller charge amount than a required proper charge amount is charged in the secondary battery. Through this, a proper charge amount may be maintained.

15 Claims, 6 Drawing Sheets

APPARATUS AND METHOD FOR MAINTAINING CHARGE AMOUNT OF SECONDARY BATTERY

TECHNICAL FIELD

The present disclosure relates to an apparatus and method for maintaining a charge amount of a secondary battery, and more particularly, to a technology for controlling a charge amount or a discharge amount to maintain a proper charge amount of a secondary battery.

The present application claims priority to Korean Patent Application No. 10-2013-0122081 filed in the Republic of Korea on Oct. 14, 2013 and Korean Patent Application No. 10-2014-0003525 filed in the Republic of Korea on Jan. 10, 2014, the disclosures of which are incorporated herein by reference.

BACKGROUND ART

Due to its characteristics of being easily applicable to various products and electrical characteristics such as a high energy density, a secondary battery is not only commonly applied to a handheld device, but universally applied to an electric vehicle (EV) or a hybrid vehicle (HV) that is propelled by an electric motor. This secondary battery is gaining attention for its primary advantage of remarkably reducing the use of fossil fuels and not generating by-products from the use of energy, making it a new eco-friendly and energy-efficient source of energy.

Recently, with the increasing interest in smart grids, an energy storage system that stores excess energy is required. The smart grid is disclosed in Korean Patent Publication Nos. 10-2011-0134803 and 10-2012-0016767. The energy storage system performs charging and discharging repeatedly based on an energy demand of an electrical grid. In particular, because the energy demand of the electrical grid is quite variable over time, it is difficult to estimate which point in time the energy storage system will start to charge or discharge to store excess energy or provide the electrical grid with energy in an amount of energy consumption the electrical grid requires. Thus, the energy storage system needs to maintain a proper charge amount so that it may be ready to charge or discharge at any time.

More specifically, a description of operation of an energy storage system in an actual environment will be provided through illustration.

Figure 1:
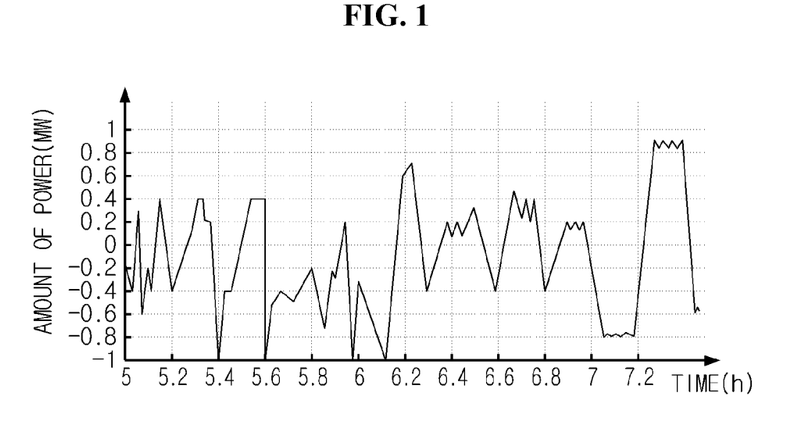
FIG. 1 is a graph illustrating changes in charge amount and discharge amount of an energy storage system over time.

FIG. 1 is a graph illustrating changes in charge amount and discharge amount of an energy storage system over time.

FIG. 1 shows an example of an amount of charging power supplied to an energy storage system and an amount of discharging power outputted from the energy storage system at a certain time zone. In FIG. 1, a longitudinal axis indicates an amount of power, and an upper portion above a value of '0' in the middle represents an amount of charging power supplied to the energy storage system and a lower portion represents an amount of discharging power outputted from the energy storage system. Accordingly, a charging period of the energy storage system is a period of time during which an amount of power consumed is less than an amount of power produced from a generator, and a discharging period of the energy storage system performs discharging is a period of time during which an amount of power consumed is more than an amount of power produced from the generator.

As shown in the illustration of FIG. 1, the energy storage system repeats charging and discharging continuously. The reason is, as described in the foregoing, that an amount of power consumption an electrical grid requires and an amount of excess power in the electrical grid unexpectedly varies over time. Assume that an energy storage system operates without separate charge/discharge control under the varying condition of an electrical grid as shown in the illustration of FIG. 1. However, for better understanding, an overall operating state of an energy storage system will be described through a change in amount of power charged in any one secondary battery included in the energy storage system.

Figure 2:
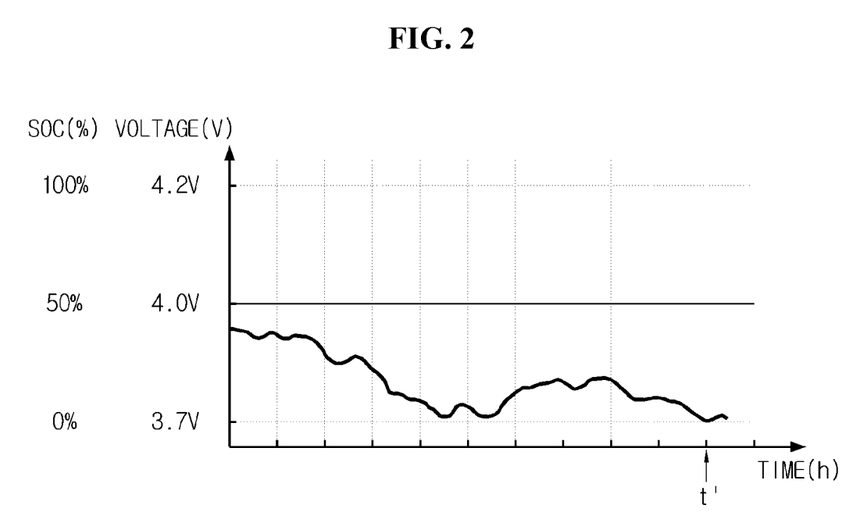
FIG. 2 is a graph illustrating an amount of power charged in a secondary battery included in an energy storage system over time.

FIG. 2 is a graph illustrating an amount of power charged in a secondary battery included in an energy storage system over time.

Referring to FIG. 2, a longitudinal axis indicates the voltage of the secondary battery. The secondary battery is an exemplary secondary battery having a voltage value of 3.7V when fully discharged and a voltage value of 4.2V when fully charged. Thus, a state of charge (SOC) corresponds to 100% at 4.2V and 0% at 3.7V. Also, for convenience of understanding, a proper charge amount of the secondary battery is assumed to correspond to 50% SOC at 4.0V.

From FIG. 2, it is found that an amount of power charged in the secondary battery gradually reduces over time. Accordingly, it can be analyzed that the exemplary situation shown in FIG. 1 corresponds to a situation in which an amount of power consumed is larger than an amount of excess power in an electrical grid to which the energy storage system is connected.

Nevertheless, as described in the foregoing, for the purpose of operation, the energy storage system needs to maintain a proper charge amount so that it may be ready to charge or discharge at any time. From this point of view, the secondary battery (or the energy storage system) does not keep a proper charge amount. Particularly, going into a point in time t' in FIG. 3, it can be seen that the secondary battery reaches the voltage of 3.7V corresponding to 0% SOC. At this point in time, if an amount of power consumed in the electrical grid increases and the energy storage system is requested to supply energy, the energy storage system cannot respond to the energy supply request.

Meanwhile, to satisfy an amount of power consumption the electrical grid requires during a peak load (a period in which power consumption is highest), the energy storage system connected to the electrical grid requires a large scale enough for charging of a large amount of excess power to satisfy an amount of power consumption in response to the peak load. However, the peak load of the electrical grid has seasonal and temporal characteristics. Accordingly, with an aim to provide sufficient power supply for satisfying an amount of power consumption required during a peak load in a particular season or at a particular time (a relatively short time), increasing a scale of the energy storage system may be a considerable cost burden.

Therefore, to solve the problem, there is a need for an apparatus and method for maintaining a charge amount of the secondary battery included in the energy storage system.

DISCLOSURE

Technical Problem

The present disclosure is designed to solve the problem of the related art, and therefore the present disclosure is directed to providing an apparatus and method for properly maintaining a charge amount of a secondary battery.

Technical Solution

To achieve the above object, an apparatus for maintaining a charge amount of a secondary battery according to the present disclosure includes a sensing unit to measure an electrical characteristic value of the secondary battery, a memory unit to store a charged power amount decrease section and a charged power amount increase section based on the electrical characteristic value of the secondary battery, and a control unit to output a control signal for reducing an amount of power charged in the secondary battery when a state of the secondary battery corresponds to the charged power amount decrease section based on the electrical characteristic value measured by the sensing unit, and to output a control signal for increasing an amount of power charged in the secondary battery when the state of the secondary battery corresponds to the charged power amount increase section based on the electrical characteristic value measured by the sensing unit.

The charged power amount decrease section is a section where the amount of power charged in the secondary battery is beyond a required charge amount maintenance section, and the charged power amount increase section is a section where the amount of power charged in the secondary battery is below the required charge amount maintenance section.

According to an exemplary embodiment of the present disclosure, the sensing unit corresponds to a voltage measurement sensor. In this case, the charged power amount decrease section and the charged power amount increase section may be set based on a voltage value of the secondary battery.

According to another exemplary embodiment of the present disclosure, the sensing unit further includes a current measurement sensor. In this case, the charged power amount decrease section and the charged power amount increase section may be set based on a state of charge (SOC) of the secondary battery.

According to an exemplary embodiment of the present disclosure, the control signal for reducing the amount of power charged in the secondary battery is a signal for reducing an amount of charging power supplied to the secondary battery.

According to another exemplary embodiment of the present disclosure, the control signal for reducing the amount of power charged in the secondary battery is a signal for increasing an amount of discharging power outputted from the secondary battery.

According to still another exemplary embodiment of the present disclosure, the control signal for reducing the amount of power charged in the secondary battery is a signal for reducing an amount of charging power supplied to the secondary battery and increasing an amount of discharging power outputted from the secondary battery.

According to an exemplary embodiment of the present disclosure, the control signal for increasing the amount of power charged in the secondary battery is a signal for reducing an amount of discharging power outputted from the secondary battery.

According to another exemplary embodiment of the present disclosure, the control signal for increasing the amount of power charged in the secondary battery is a signal for increasing an amount of charging power supplied to the secondary battery.

According to still another exemplary embodiment of the present disclosure, the control signal for increasing the amount of power charged in the secondary battery is a signal for reducing an amount of discharging power outputted from the secondary battery and increasing an amount of charging power supplied to the secondary battery.

In the apparatus for maintaining the charge amount of the secondary battery according to the present disclosure, the memory unit further stores a charging stop section where the amount of power charged in the secondary battery represents a larger amount of power than the charged power amount decrease section, and the control unit may output a control signal for stopping the charge of the secondary battery when the state of the secondary battery corresponds to the charging stop section based on the electrical characteristic value measured by the sensing unit.

In the apparatus for maintaining the charge amount of the secondary battery according to the present disclosure, the memory unit further stores a discharging stop section where the amount of power charged in the secondary battery represents a smaller amount of power than the charged power amount increase section, and the control unit may output a control signal for stopping the discharge of the secondary battery when the state of the secondary battery corresponds to the discharging stop section based on the electrical characteristic value measured by the sensing unit.

In the apparatus for maintaining the charge amount of the secondary battery according to the present disclosure, when the state of the secondary battery corresponds to the required charge amount maintenance section based on the electrical characteristic value measured by the sensing unit, the control unit may calculate an amount of discharging power of the secondary battery using the electrical characteristic value of the secondary battery measured by the sensing unit during discharging of the secondary battery, and may output a control signal for charging the secondary battery by an amount of charging power obtained as a result of adding an amount of power compensation to the calculated amount of discharging power when charging the secondary battery.

The apparatus for maintaining the charge amount of the secondary battery according to the present disclosure may be a component of an energy storage system including a plurality of secondary batteries, an apparatus for maintaining a charge amount of a secondary battery according to any one of claims 1 through 39, and a power inverter unit to provide a charging power to the secondary battery or provide a discharging power from the secondary battery to an external, in response to a control signal outputted from the control unit included in the apparatus for maintaining the charge amount of the secondary battery.

To achieve the above object, a method for maintaining a charge amount of a secondary battery according to the present disclosure is a method which maintains a charge amount of a secondary battery through an apparatus for maintaining the charge amount of the secondary battery including a sensing unit to measure an electrical characteristic value of the secondary battery, a memory unit to store a charged power amount decrease section and a charged power amount increase section based on the electrical characteristic value of the secondary battery, and a control unit to output a control signal for reducing or increasing an amount of power charged in the secondary battery, and includes (a) receiving, by the control unit, a signal for the electrical characteristic value of the secondary battery from the sensing unit, (b) determining, by the control unit, whether a state of the secondary battery corresponds to the charged power amount decrease section or the charged power amount increase section based on the electrical characteristic value of the secondary battery, and (c) outputting, by the control unit, a control signal for reducing the amount of power charged in the secondary battery when the state of the secondary battery corresponds to the charged power amount decrease section, and outputting a control signal for increasing the amount of power charged in the secondary battery when the state of the secondary battery corresponds to the charged power amount increase section.

Advantageous Effects

According to one aspect of the present disclosure, a secondary battery may maintain a proper charge amount in a changing external environment, in particular, an environment in which charging and discharging changes frequently.

According to another aspect of the present disclosure, a secondary battery may hold an available charge capacity and an available discharge capacity by properly maintaining the charge amount of the secondary battery.

According to still another aspect of the present disclosure, an energy storage system connected to an electrical grid may react to a charge or discharge situation during a peak load in the electrical grid more flexibly.

According to yet another aspect of the present disclosure, an energy storage system does not respond to all peak demands for energy, and thus may obtain a high operation effect with a smaller-scale system during operation of the energy storage system.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure. However, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Prior to the detailed description of an apparatus and method for maintaining a charge amount of a secondary battery according to the present disclosure, a brief concept will be first described.

Figure 3:
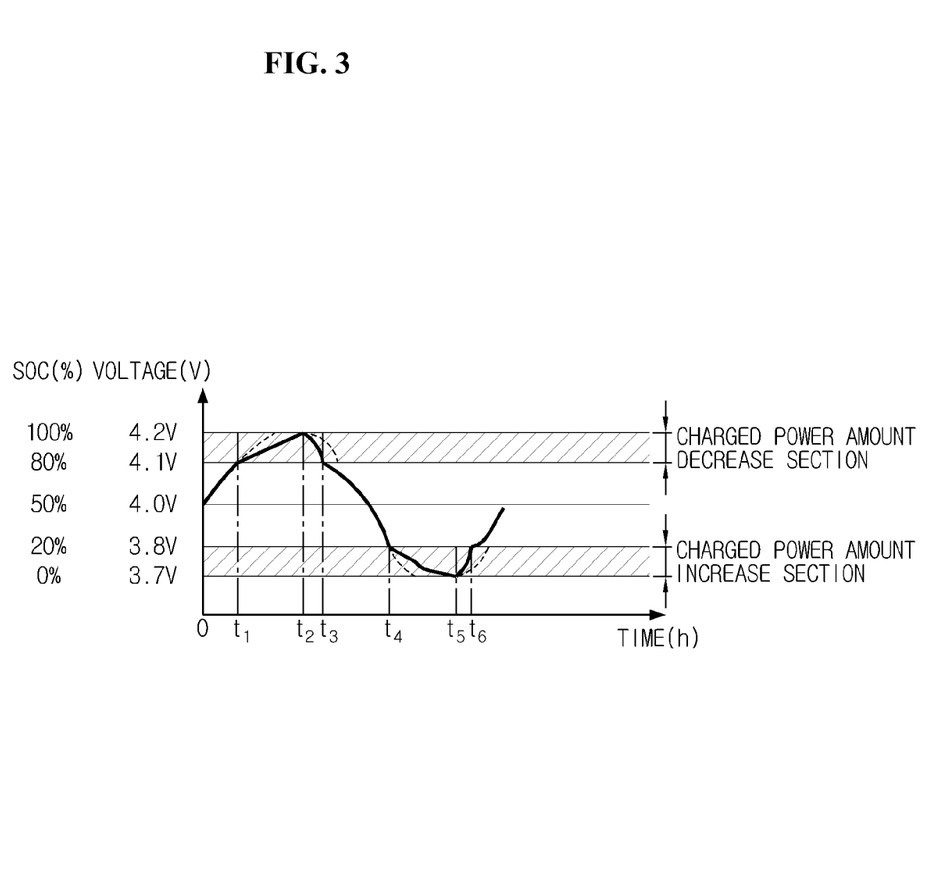
FIG. 3 is a graph illustrating charging and discharging of a secondary battery where a charged power amount decrease section and a charged power amount increase section are set according to the present disclosure.

FIG. 3 is a graph illustrating charging and discharging of a secondary battery where a charged power amount decrease section and a charged power amount increase section are set according to the present disclosure.

Referring to FIG. 3, it can be seen that among the voltage sections of the secondary battery, a 4.1V~4.2V voltage section (corresponding to SOC 80%~100%) is set as a 'charged power amount decrease section'. Also, it can be seen that among the voltage sections of the secondary battery, a 3.7V~3.8V voltage section (corresponding to SOC 0%~20%) is set as a 'charged power amount increase section'. Also, in FIG. 3, a voltage curve of the secondary battery changing with any charging power and discharging power is shown. When an amount of power charged in the secondary battery increases, the secondary battery increases in voltage, and when an amount of power charged in the secondary battery decreases, the secondary battery decreases in voltage. It should be understood that this voltage change is just for illustration to help a better understanding of the features of the present disclosure. That is, the charged power amount decrease section and the charged power amount increase section shown in FIG. 3 is for illustration only, and may be set based on various criteria for indicating an amount of power charged in the secondary battery as well as voltage of the secondary battery and a SOC of the secondary battery.

According to the present disclosure, the charged power amount decrease section is a section where an amount of power charged in the secondary battery is beyond a required charge amount maintenance section. Also, the charged power amount increase section is a section where an amount of power charged in the secondary battery is below the required charge amount maintenance section. Therefore, in the illustration, it can be seen that the charge amount maintenance section is a 3.8V~4.1V section.

The present disclosure is characterized by controlling the charge and discharge of a secondary battery to maintain a charge amount of the secondary battery at a proper state. In the illustration, charging and discharging of the secondary battery is controlled to maintain the voltage of the secondary battery within the 3.8V~4.1V section. To do so, when the voltage of the secondary battery corresponds to the charged power amount decrease section, the present disclosure performs a control operation to reduce an amount of power charged in the secondary battery. Also, when the voltage of the secondary battery corresponds to the charged power amount increase section, the present disclosure performs a control operation to increase an amount of power charged in the secondary battery. Through the control operation, the present disclosure may keep an amount of power charged in the secondary battery within the charge amount maintenance section longer or may maintain an amount of power charged in the secondary battery more closely to the charge power amount maintenance section.

The control operation for reducing the amount of power charged in the secondary battery involves reducing an amount of charging power supplied to the secondary battery. That is, the secondary battery is selectively charged with a portion of an amount of excess power in an electrical grid rather than an overall amount of excess power.

Also, the control operation for reducing the amount of power charged in the secondary battery involves increasing an amount of discharging power outputted from the secondary battery. That is, an electrical grid is supplied with a larger amount of power than an amount to power consumption required in the electrical grid.

Also, the control operation for reducing the amount of power charged in the secondary battery involves reducing an amount of charging power supplied to the secondary battery and increasing an amount of discharging power outputted from the secondary battery together.

Meanwhile, the control operation for increasing the amount of power charged in the secondary battery involves reducing an amount of discharging power outputted from the secondary battery. That is, an electrical grid is supplied with a smaller amount of power than an amount to power consumption required in the electrical grid.

Also, the control operation for increasing the amount of power charged in the secondary battery involves increasing an amount of charging power supplied to the secondary battery. That is, the secondary battery is supplied not only with excess power in the electrical grid but also with additional power like a power consuming component among components connected to the electrical grid.

Also, the control operation for increasing the amount of power charged in the secondary battery involves reducing an amount of discharging power outputted from the secondary battery and increasing an amount of charging power supplied to the secondary battery together.

When the secondary battery is charged or discharged by the above control operation, its effect will be described in further detail for each section.

First, it can be seen that a $0$~$t_1$ section is a section where a charging power is supplied to the secondary battery and the secondary battery increases in voltage. In this instance, a slope of the curve increasing in voltage is proportional to an amount of charging power supplied from an external. Also, it is seen that the voltage of the secondary battery reaches the charged power amount decrease section at the point in time $t_1$. Accordingly, control is needed to reduce the amount of power charged in the secondary battery from the point in time $t_1$.

Next, a $t_1$~$t_2$ section is a section where the secondary battery is charged with an amount of charging power reduced by the control operation of reducing the amount of power charged in the secondary battery. In the $t_1$~$t_2$ section, a portion indicated by a dotted line represents a voltage curve when the secondary battery would be charged with an original amount of charging power to be supplied to the secondary battery. If the secondary battery is charged with the original amount of charging power, the voltage of the secondary battery reaches a fully charged voltage (4.2V) corresponding to 100% SOC more quickly than when the secondary battery is charged with the reduced amount of charging power as shown. In contrast, if the secondary battery is charged with the reduced amount of charging power, the voltage of the secondary battery reaches the fully charged voltage (4.2V) corresponding to 100% SOC more slowly. As a result, the present disclosure may maintain the amount of power charged in the secondary battery more closely to 50% SOC previously assumed as a proper SOC for a longer period of time.

Next, let us look at a $t_2$~$t_3$ section. The $t_2$~$t_3$ section is a section where the secondary battery is discharged by an amount of discharging power increased by the control operation of reducing the amount of power charged in the secondary battery. In the $t_2$ and $t_3$ section, a portion indicated by a dotted line represents a voltage curve when the secondary battery would be discharged by an original amount of discharging power outputted from the secondary battery. If the secondary battery is discharged by the original amount of discharging power, the voltage of the secondary battery reaches a voltage (4.1V) corresponding to 80% SOC more slowly than when the secondary battery is discharged with the increased amount of discharging power as shown. In contrast, if the secondary battery is discharged by the increased amount of discharging power, the voltage of the secondary battery reaches the voltage (4.1V) corresponding to 80% SOC more quickly. As a result, the present disclosure may maintain the amount of power charged in the secondary battery more closely to 50% SOC previously assumed as a proper SOC for a longer period of time.

Next, it can be seen that a $t_3$~$t_4$ section is a section where the secondary battery is discharged and the voltage of the secondary battery drops. In this instance, a slope of the curve reducing in voltage is proportional to an amount of discharging power outputted from the secondary battery. Also, it is seen that the secondary battery is discharged continuously and the voltage of the secondary battery reaches the charged power amount increase section at the point in time $t_4$. Accordingly, control is needed to increase an amount of power charged in the secondary battery from the point in time $t_4$.

A $t_4$~$t_5$ section is a section where the secondary battery is discharged by an amount of discharging power reduced by the control operation of reducing the amount of power charged in the secondary battery. In the $t_4$~$t_5$ section, a portion indicated by a dotted line represents a voltage curve when the secondary battery would be discharged with an original amount of discharging power outputted from the secondary battery. If the secondary battery is discharged by the original amount of discharging power, the voltage of the secondary battery reaches a fully discharged voltage (3.7V) corresponding to 0% SOC more quickly than when the secondary battery is discharged by the reduced amount of discharging power as shown. In contrast, if the secondary battery is discharged by the reduced amount of discharging power, the voltage of the secondary battery reaches the fully discharged voltage (3.7V) corresponding to 0% SOC more slowly. As a result, the present disclosure may maintain the amount of power charged in the secondary battery more closely to 50% SOC previously assumed as a proper SOC for a longer period of time.

Next, let us see a $t_5$~$t_6$ section. The $t_5$~$t_6$ section is a section where the secondary battery is charged with an amount of charging power increased by the control operation of increasing the amount of power charged in the secondary battery. In the $t_5$~$t_6$ section, a portion indicated by a dotted line represents a voltage curve when the secondary battery would be charged with an original amount of charging power supplied to the secondary battery. If the secondary battery is charged with the original amount of charging power, the voltage of the secondary battery reaches a voltage (3.8V) corresponding to 20% SOC more slowly than when the secondary battery is charged with the increased amount of charging power as shown. In contrast, if the secondary battery is charged with the increased amount of charging power, voltage of the secondary battery reaches the voltage (3.8V) corresponding to 20% SOC more quickly. As a result, the present disclosure may maintain the amount of power charged in the secondary battery more closely to 50% SOC previously assumed as a proper SOC for a longer period of time.

Meanwhile, the present disclosure may further set a charging stop section where the amount of power charged in the secondary battery is beyond the charged power amount decrease section. In this case, when the state of the secondary battery corresponds to the charging stop section, the present disclosure may perform a control operation for stopping the charge of the secondary battery.

Also, the present disclosure may further set a discharging stop section where the amount of power charged in the secondary battery is below the charged power amount increase section. In this case, when the state of the secondary battery corresponds to the discharging stop section, the present disclosure may perform a control operation for stopping the discharge of the secondary battery.

Figure 4:
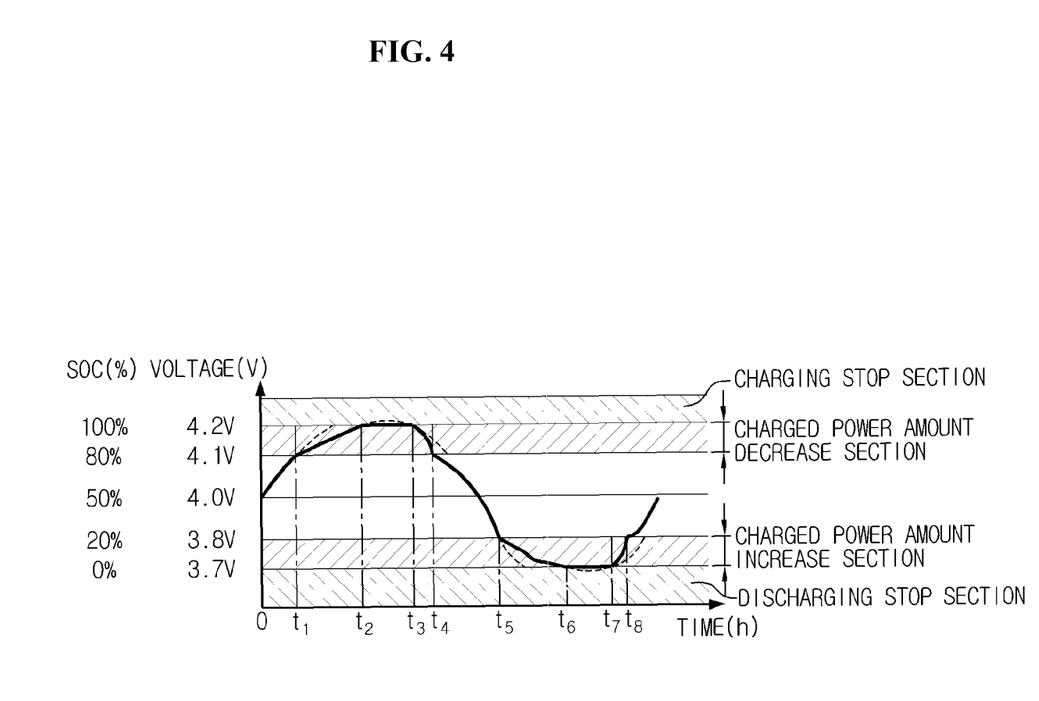
FIG. 4 is a graph illustrating charging and discharging of a secondary battery where a charging stop section and a discharging stop section are further set according to the present disclosure.

FIG. 4 is a graph illustrating charging and discharging of a secondary battery where a charging stop section and a discharging stop section are further set according to the present disclosure.

Referring to FIG. 4, it can be seen that the 'charging stop section' is set at a higher voltage section than the 'charged power amount decrease section'. Also, it can be seen that the 'discharging stop section' is set at a lower voltage section than the 'charged power amount increase section'.

Even though the above control operation is performed on the 'charged power amount decrease section', when the state of the secondary battery corresponds to the 'charging stop section', the present disclosure may perform a control operation for stopping the charge of the secondary battery. Accordingly, it can be seen that the voltage of the secondary battery does not rise because charging does not work any farther in the $t_2$~$t_3$ section shown in FIG. 4.

Also, even though the above control operation is performed on the 'charged power amount increase section', when the state of the secondary battery corresponds to the 'discharging stop section', the present disclosure may perform a control operation for stopping the discharge of the secondary battery. Accordingly, it can be seen that the voltage of the secondary battery does not drop because discharging does not work any farther in the $t_6$~$t_7$ section shown in FIG. 4.

Since $t_1$~$t_2$, $t_3$~$t_6$, and $t_7$~$t_8$ in FIG. 4 is a section where the secondary battery is charged and discharged by the same control operation previously described, a repeated description is omitted herein.

Meanwhile, a general secondary battery experiences a power loss during repeated charging and discharging.

Figure 5:
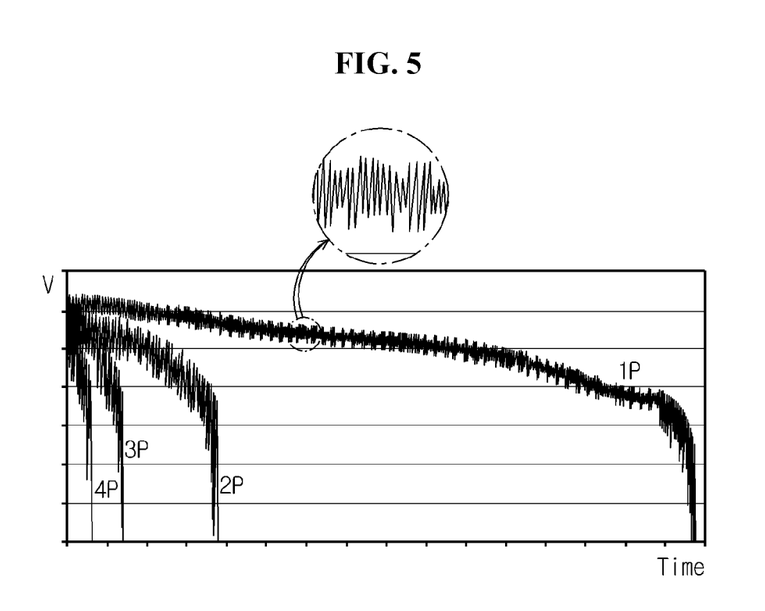
FIG. 5 is a graph illustrating profiles in which a voltage drop phenomenon occurs when charging and discharging of a secondary battery is controlled by a general charging algorithm.

FIG. 5 is a graph illustrating profiles in which a voltage drop phenomenon occurs when charging and discharging of a secondary battery is controlled by a general charging algorithm.

Referring to FIG. 5, a horizontal axis of the graph represents time, and a vertical axis of the graph represents voltage of the secondary battery. Also, '1P, 2P, 3P, 4P' are indicated for each profile, and here, 'P' denotes 'P-rate'.

'P-rate' is a unit representing a discharge rate of the secondary battery. 'P-rate' is calculated by W/Wh whose a denominator is a total amount of power (Wh) of the secondary battery and a numerator is a discharging power (W).

Generally, 'C-rate' representing a discharge rate of the secondary battery is a discharge rate calculated based on current. 'C-rate' is calculated by mA/mAh whose a denominator is a total amount of current (mAh, an amount of electric charge) of the secondary battery and a numerator is a discharging current (mA). However, discharging relies on not only current but also voltage, due to the electrical characteristics of the secondary battery. The power outputted from the secondary battery may change by various factors, for example, a change of a load connected to the secondary battery or a reduction in open voltage of the secondary battery caused by a reduction in charge amount. Accordingly, when a discharge rate is determined based on 'P-rate' in which both current and voltage are taken into consideration, the state of the secondary battery may not be determined in terms of current but in terms of energy stored in and drawn from the secondary battery.

A total of four profiles shown in FIG. 5 show a dynamic voltage of the secondary battery measured during repeated charging and discharging of the same secondary battery at varying ratios of discharging power. 2P represents a voltage profile during discharging with a larger amount of power twice than that of 1P, 3P represents a voltage profile during discharging with a larger amount of power three times than that of 1P, and 4P represents a voltage profile during discharging with a larger amount of power four times than that of 1P. When power from the secondary battery is supplied to a load, an amount of power supplied from the secondary battery to the load is measured, summed up, and stored as an amount of discharging power. Also, the same amount of power as the amount of discharging power is supplied and used to charge the secondary battery. Referring to an enlarged section of the 1P profile in FIG. 5, a period of time during which the dynamic voltage of the secondary battery reduces corresponds to a discharging period of the secondary battery, and a period of time during which the dynamic voltage of the secondary battery increases corresponds to a charging period of the secondary battery.

As demonstrated in FIG. 5, it can be seen that even though the secondary battery is charged with the same amount of power as the amount of discharging power, the profiles of the dynamic voltage of the secondary battery gradually drop as charging and discharging repeat. Meanwhile, the voltage of the secondary battery is an index indirectly indicating a charge amount of the secondary battery. Accordingly, this voltage drop phenomenon of the secondary battery implies that an amount of charge stored in the secondary battery gradually reduces even though the secondary battery is charged with the same amount of power as the amount of discharging power. This phenomenon occurs at a voltage drop speed changing based on ratios of discharging power, but there is no difference in the sense that such phenomenon finally occurs in the secondary battery.

In terms of energy of the secondary battery, let us see a voltage drop phenomenon of a secondary battery, that is, a phenomenon in which an amount of charge stored in a secondary battery reduces due to repeated charging and discharging. When a secondary battery is fully charged, energy as much as a charge amount of the secondary battery is stored in the secondary battery. Also, discharging of a secondary battery is said to be a process in which energy stored in the secondary battery is converted into a form of electrical energy and supplied to a load. Also, charging of a secondary battery is said to be a process in which electrical energy is supplied to the secondary battery and energy as much as a charge amount of the secondary battery is stored in the secondary battery.

In an ideal secondary battery, there is no internal resistance affecting a charging/discharging process, but actually, a secondary battery has an internal resistance. Accordingly, a loss occurs in a secondary battery in the process of energy conversion, for example, heat generation through an internal resistance during discharging. However, measurement of an amount of discharging power does not involve measurement of an amount of energy loss. The measurement of discharging power corresponds to measurement of an amount of power transmitted from a secondary battery to a load, that is, measurement of only an amount of electrically transmitted energy, and thus, a measured amount of discharging power is smaller than an amount of energy actually drawn from a secondary battery. Therefore, if a secondary battery is only charged with an amount of power corresponding to a measured amount of discharging power, a charge amount of the secondary battery will gradually reduce.

Also, actually, internal resistance of a secondary battery affects a charging process as well as a discharging process. That is, the energy loss described in the foregoing occurs not only during discharging but also during charging. Some of the electrical energy supplied to a secondary battery through an electrical grid is lost in the process of energy conversion, for example, heat generation by the internal resistance of the secondary battery. Also, only the rest is stored in an amount of energy corresponding to the charge amount of the secondary battery. Thus, even though an energy loss occurred during discharging is accurately measured and a corresponding amount of power is supplied to the secondary battery, an actual amount of energy stored in the secondary battery is inevitably smaller than an amount of supplied energy. Accordingly, as charging and discharging repeats, a charge amount of a secondary battery will gradually reduce as much an amount of power lost during charging of the secondary battery.

As described in the foregoing, an amount of discharging power measured during discharging is smaller than an amount of power (amount of charge) drawn from a secondary battery. Also, even though the secondary battery is charged with the same amount of power as the measured amount of discharging power, an amount of power (a charge amount) stored in the secondary battery is smaller than the amount of discharging power. That is, as charging/discharging is performed repeatedly, an amount of charge stored in a secondary battery gradually reduces. Also, a reduction in charge amount can be seen as a voltage drop phenomenon of a secondary battery.

A reduction in charge amount of a secondary battery occurs due to the internal resistance of the secondary battery, and may also occur during energy transfer between the secondary battery and an electrical grid. Generally, in addition to a secondary battery, an energy storage system includes a power inverter unit together. The power inverter unit serves to provide the secondary battery with a charging power supplied from an external (for example, an electrical grid), or supply power discharged from the secondary battery to the external (for example, an electrical grid). In the process of power supply, the power inverter unit inverts into power having a voltage and a frequency required by the electrical grid, and vice versa. In the process of discharging power stored in the secondary battery to the electrical grid through the power inverter unit, an energy loss occurs. Also, in the process of charging the secondary battery with power supplied from the electrical grid through the power inverter unit, an energy loss occurs.

Accordingly, to cope with this fact, when the state of the secondary battery corresponds to the required charge amount maintenance section, the present disclosure calculates an amount of discharging power of the secondary battery and when the secondary battery is charged, may perform a control operation to charge the secondary battery by an amount of charging power obtained as a result of adding an amount of power compensation to the calculated amount of discharging power.

That is, when charging the secondary battery, charging is controlled to provide the secondary battery with a larger amount of power than an amount of excess power. In this instance, an amount of power added to an amount of excess power is an 'amount of power compensation'.

While the control operation of the present disclosure has been roughly described hereinabove, a configuration of an apparatus for maintaining a charge amount of a secondary battery according to the present disclosure will be described.

Figure 6:
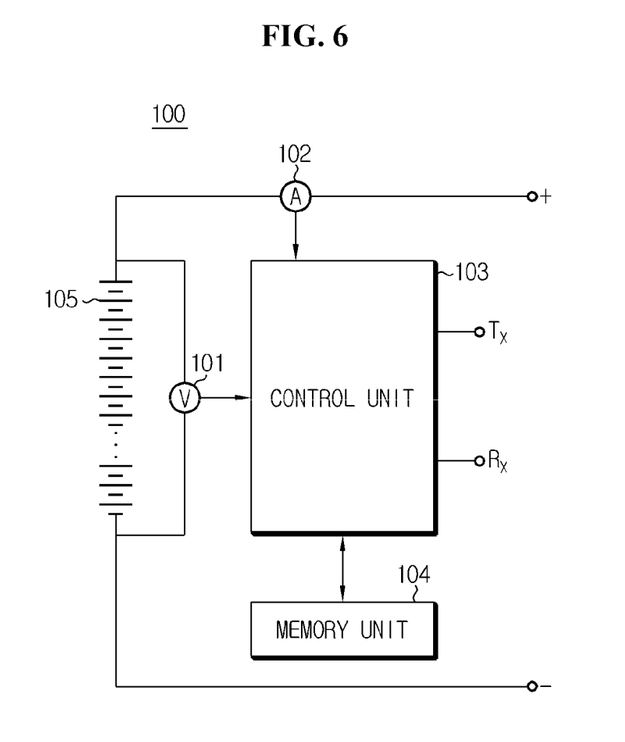
FIG. 6 is a block diagram schematically illustrating a configuration of an apparatus for maintaining a charge amount of a secondary battery according to an exemplary embodiment of the present disclosure.

FIG. 6 is a block diagram schematically illustrating a configuration of an apparatus 100 for maintaining a charge amount of a secondary battery according to an exemplary embodiment of the present disclosure.

Referring to FIG. 6, the apparatus 100 for maintaining a charge amount of a secondary battery according to the present disclosure includes a sensing unit, a memory unit 104, and a control unit 103.

The apparatus 100 for maintaining a charge amount of a secondary battery according to the present disclosure is electrically connected to a secondary battery 105. The secondary battery 105 is not limited to a specific type. Each secondary battery 105 is rechargeable and needs consideration of a charge or discharge voltage, and may include a lithium ion battery, a lithium polymer battery, a Ni—Cd battery, a Ni-MH battery, a Ni—Zn battery, and the like. Also, a number of secondary batteries 111 connected to the apparatus 100 for maintaining a charge amount of a secondary battery according to the present disclosure may be variously set based on a required output voltage or charge/discharge capacity. However, the present disclosure is not limited by a type, an output voltage, and a charge capacity of the secondary battery 105, and the like. Although FIG. 6 shows an embodiment in which the secondary batteries 105 are all connected in series, the present disclosure is not limited by a connection method of the secondary batteries 105.

The sensing unit measures an electrical characteristic value of the secondary battery 105 and outputs a signal representing the electrical characteristic value to the control unit 103. The electrical characteristic value represents a voltage of the secondary battery 105, an electric current flowing through a conductor during charging/discharging, and the like. In the present disclosure, the electrical characteristic value is measured to identify a state of the secondary battery 105, for example, estimate an SOC of the secondary battery 105.

The memory unit 104 stores a preset charging limit section and a preset discharging limit section based on the electrical characteristic value of the secondary battery 105.

The control unit 103 outputs a control signal for reducing the amount of power charged in the secondary battery when the state of the secondary battery 105 corresponds to the charged power amount decrease section based on the electrical characteristic value measured by the sensing unit, and outputs a control signal for increasing the amount of power charged in the secondary battery when the state of the secondary battery corresponds to the charged power amount increase section based on the electrical characteristic value measured by the sensing unit. An algorithm of the control unit 103 for maintaining the charge amount of the secondary battery 105 is described in the foregoing, and a repeated description is omitted herein.

According to an exemplary embodiment of the present disclosure, the sensing unit is a voltage measurement sensor 101. The voltage measurement sensor 101 measures a voltage of the secondary battery 105 and outputs a corresponding voltage signal to the control unit 103. Although FIG. 6 shows that an electrical connection is configured to allow the voltage measurement sensor 101 to measure a voltage across both ends of secondary batteries 105 connected in series, the present disclosure is not limited to the illustration shown in FIG. 6. The voltage measurement sensor 101 may be electrically connected to both ends of each secondary battery 105, and may be constructed in various numbers. In this instance, the charging limit section and the discharging limit section may be set by the voltage value of the secondary battery.

According to another exemplary embodiment of the present disclosure, the sensing unit may further include a current measurement sensor 102. The current measurement sensor 102 may measure a magnitude of an electric current flowing across a resistor element R connected between the secondary battery 105 and a power supply means or a load during charging or discharging of the secondary battery 105, and output a corresponding current signal to the control unit 103. In this case, the charging limit section and the discharging limit section may be set by an SOC of the secondary battery. The SOC refers to a ratio of a current charge amount relative to a fully charged state of the secondary battery. As a method of calculating an SOC, there are various known techniques in the technical field to which the present disclosure belongs, and its detailed description is omitted herein.

Meanwhile, the memory unit 104 may be inside or outside of the control unit 103, and connected to the control unit 103 by a variety of well-known means. The memory unit 104 is a high-capacity storage medium known as being capable of recording and erasing data, such as a semiconductor device or a hard disk, for example, random access memory (RAM), read-only memory (ROM), electrical erasable programmable read-only memory (EEPROM), and the like, and encompasses any device capable of storing information regardless of a device type and is not limited to a specific memory device.

Meanwhile, the memory unit 104 may further store the 'charging stop section', the 'discharging stop section', and the 'charge amount maintenance section' described in the foregoing according to the exemplary embodiment of the present disclosure.

Meanwhile, a method of reducing the amount of power charged in the secondary battery within the charged power amount decrease section may be various.

According to an exemplary embodiment of the present disclosure, the memory unit 104 may store a charging power subtraction amount. Also, the control signal outputted from the control unit 103 for reducing the amount of power charged in the secondary battery 105 is a signal for controlling the charge of the secondary battery 105 by an amount of power obtained as a result of subtracting the charging power subtraction amount from the amount of charging power supplied to the secondary battery 105.

Meanwhile, the charging power subtraction amount is not a fixed value, and its value increases in proportion to the amount of power charged in the secondary battery 105 within the charged power amount decrease section and may be looked up from a look-up table. Also, the control signal for reducing the amount of power charged in the secondary battery 105 outputted from the control unit 103 may be a signal for controlling the charge of the secondary battery 105 by an amount of power obtained as a result of subtracting the charging power subtraction amount selected from the look-up table based on the amount of power charged in the secondary battery 105 from the amount of power charged in the secondary battery 105.

According to another exemplary embodiment of the present disclosure, the memory unit 104 may further store a reduced charging power amount. Also, the control signal outputted from the control unit 103 to reduce the amount of power charged in the secondary battery 105 is a signal for controlling the charge of the secondary battery 105 by the reduced charging power amount.

Meanwhile, the reduced charging power amount increases in its value in proportion to the amount of power charged in the secondary battery 105 within the charged power amount decrease section, and may be looked up from a look-up table. In this case, the control signal for reducing the amount of power charged in the secondary battery 105 outputted from the control unit 103 may be a signal for controlling the charge of the secondary battery 105 by the reduced charging power amount selected from the look-up table based on the amount of power charged in the secondary battery 105.

According to still another exemplary embodiment of the present disclosure, the memory unit 104 may further store a charging power amount reduction ratio. Also, the control signal for reducing the amount of power charged in the secondary battery 105 outputted from the control unit 103 may be a signal for controlling the charge of the secondary battery 105 by an amount of charging power calculated by the control unit 103 based on the charging power amount reduction ratio to the amount of charging power supplied to the secondary battery 105.

Meanwhile, the charging power amount reduction ratio increases in its value in proportion to the amount of power charged in the secondary battery 105 within the charged power amount decrease section, and may be looked up from a look-up table. In this case, the control signal for reducing the amount of power charged in the secondary battery 105 outputted from the control unit 103 may be a signal for controlling the charge of the secondary battery 105 by an amount of charging power calculated by the control unit 103 based on the charging power amount reduction ratio selected from the look-up table based on the amount of power charged in the secondary battery 105.

According to an exemplary embodiment of the present disclosure, the memory unit 104 may further store an additional discharging power amount. Also, the control signal outputted from the control unit 103 for reducing the amount of power charged in the secondary battery 105 is a signal for controlling the discharge of the secondary battery 105 by an amount of power obtained as a result of adding the additional discharging power amount to the amount of discharging power outputted from the secondary battery 105.

Meanwhile, the additional discharging power amount increases in its value in proportion the an amount of power charged in the secondary battery 105 within the charged power amount decrease section, and may be looked up from a look-up table. In this case, the control signal for reducing the amount of power charged in the secondary battery 105 outputted from the control unit 103 may be a signal for controlling the discharge of the secondary battery 105 by an amount of power obtained as a result of adding the additional discharging power amount selected from the look-up table based on the amount of power charged in the secondary battery 105 to the amount of discharging power outputted from the secondary battery 105.

According to another exemplary embodiment of the present disclosure, the memory unit 104 may further store an increased discharging power amount. Also, a control signal outputted from the control unit 103 for reducing the amount of power charged in the secondary battery 105 is a signal for controlling the discharge of the secondary battery 105 by the increased discharging power amount.

Meanwhile, the increased discharging power amount increases in its value in proportion to the amount of power charged in the secondary battery 105 within the charged power amount decrease section, and may be looked up from a look-up table. In this case, the control signal for reducing the amount of power charged in the secondary battery 105 outputted from the control unit 103 may be a signal for controlling the discharge of the secondary battery 105 by the increased discharging power amount selected from the look-up table based on the amount of power charged in the secondary battery 105.

According to still another exemplary embodiment of the present disclosure, the memory unit 104 may further store a discharging power amount increase ratio. Also, the control signal for reducing the amount of power charged in the secondary battery 105 outputted from the control unit 103 may be a signal for controlling the discharge of the secondary battery 105 by an amount of discharging power calculated by the control unit 103 based on the discharging power amount increase ratio to the amount of discharging power outputted from the secondary battery 105.

Meanwhile, the discharging power amount increase ratio increases in its value in proportion to the amount of power charged in the secondary battery 105 within the charged power amount decrease section, and may be looked up from a look-up table. In this case, the control signal for reducing the amount of power charged in the secondary battery outputted from the control unit 103 may be a signal for controlling the discharge of the secondary battery 105 by an amount of discharging power calculated by the control unit 103 based on the discharging power amount reduction ratio selected from the look-up table based on the amount of power charged in the secondary battery 105.

The above embodiments are embodiments about the cases of either increasing the discharge amount or decreasing the charge amount within the charged power amount decrease section. However, an embodiment about the case of increasing the discharge amount and decreasing the charge amount together may be also applied.

Meanwhile, a method of increasing the amount of power charged in the secondary battery within the charged power amount increase section may be various.

According to an exemplary embodiment of the present disclosure, the memory unit 104 may store a discharging power subtraction amount. Also, the control signal outputted from the control unit 103 for increasing the amount of power charged in the secondary battery 105 is a signal for controlling the discharge of the secondary battery 105 by an amount of power obtained as a result of subtracting the discharging power subtraction amount from the amount of charging power outputted from the secondary battery 105.

Meanwhile, the discharging power subtraction amount is not a fixed value, and increases in its value in inverse proportion to the amount of power charged in the secondary battery 105 within the charged power amount increase section, and may be looked up from a look-up table. In this case, the control signal for increasing the amount of power charged in the secondary battery 105 outputted from the control unit 103 may be a signal for controlling the discharge of the secondary battery 105 by an amount of power obtained as a result of subtracting the discharging power subtraction amount selected from the look-up table based on the amount of power charged in the secondary battery 105 from the amount of discharging power outputted from the secondary battery 105.

According to another exemplary embodiment of the present disclosure, the memory unit 104 may further store a reduced discharging power amount. Also, the control signal outputted from the control unit 103 for increasing the amount of power charged in the secondary battery 105 is a signal for controlling the discharge of the secondary battery 105 by the reduced discharging power amount.

Meanwhile, the reduced discharging power amount increases in its value in inverse proportion to the amount of power charged in the secondary battery 105 within the charged power amount increase section, and may be looked up from a look-up table. In this case, the control signal for increasing the amount of power charged in the secondary battery 105 outputted from the control unit 103 may be a signal for controlling the discharge of the secondary battery 105 by the reduced discharging power amount selected from the look-up table based on the amount of power charged in the secondary battery 105.

According to still another exemplary embodiment of the present disclosure, the memory unit 104 may further store a discharging power amount reduction ratio. Also, the control signal for increasing the amount of power charged in the secondary battery 105 outputted from the control unit 103 may be a signal for controlling the discharge of the secondary battery 105 by an amount of charging power calculated by the control unit 103 based on the discharging power amount reduction ratio to the amount of discharging power outputted from the secondary battery 105.

Meanwhile, the discharging power amount reduction ratio increases in its value in inverse proportion to the amount of power charged in the secondary battery 105 within the charged power amount increase section, and may be looked up from a look-up table. In this case, the control signal for increasing the amount of power charged in the secondary battery 105 outputted from the control unit 103 may be a signal for controlling the charge of the secondary battery 105 by an amount of discharging power calculated by the control unit 103 based on the discharging power amount reduction ratio selected from the look-up table based on the amount of power charged in the secondary battery 105.

According to an exemplary embodiment of the present disclosure, the memory unit 104 may further store an additional charging power amount. Also, the control signal outputted from the control unit 103 for increasing the amount of power charged in the secondary battery 105 is a signal for controlling the charge of the secondary battery 105 by an amount of power obtained as a result of adding the additional charging power amount to the amount of charging power supplied to the secondary battery 105.

Meanwhile, the additional charging power amount increases in its value in inverse proportion to the amount of power charged in the secondary battery 105 within the charged power amount increase section, and may be looked up from a look-up table. In this case, the control signal for increasing the amount of power charged in the secondary battery 105 outputted from the control unit 103 may be a signal for controlling the charge of the secondary battery 105 by an amount of power obtained as a result of adding the additional charging power amount selected from the look-up table based on the amount of power charged in the secondary battery 105 to the amount of charging power supplied to the secondary battery 105.

According to another exemplary embodiment of the present disclosure, the memory unit 104 may further store an increased charging power amount. Also, the control signal outputted from the control unit 103 for increasing the amount of power charged in the secondary battery 105 is a signal for controlling the charge of the secondary battery 105 by the increased charging power amount.

Meanwhile, the increased charging power amount increases in its value in inverse proportion to the amount of power charged in the secondary battery 105 within the charged power amount increase section, and may be looked up from a look-up table. In this case, the control signal for increasing the amount of power charged in the secondary battery 105 may be a signal for controlling the charge of the secondary battery 105 by the increased charging power amount selected from the look-up table based on the amount of power charged in the secondary battery 105.

According to still another exemplary embodiment of the present disclosure, the memory unit 104 may further store a charging power amount increase ratio. Also, the control signal for increasing the amount of power charged in the secondary battery 105 outputted from the control unit 103 may be a signal for controlling the charge of the secondary battery 105 by an amount of charging power calculated by the control unit 103 based on the charging power amount increase ratio to the amount of charging power supplied to the secondary battery 105.

Meanwhile, the charging power amount increase ratio increases in its value in inverse proportion to the amount of power charged in the secondary battery 105 within the charged power amount increase section, and may be looked up from a look-up table. In this case, the control signal for increasing the amount of power charged in the secondary battery outputted from the control unit 103 may be a signal for controlling the charge of the secondary battery 105 by an amount of charging power calculated by the control unit 103 based on the charging power amount reduction ratio selected from the look-up table based on the amount of power charged in the secondary battery 105.

The above embodiments are embodiments about the cases of either reducing the discharge amount or increasing the charge amount within the charged power amount increase section. However, an embodiment about the case of reducing the discharge amount and increasing the charge amount together may be also applied.

The apparatus for maintaining the charge amount of the secondary battery according to the present disclosure may be a component of an energy storage system including a plurality of secondary batteries, an apparatus for maintaining a charge amount of a secondary battery, and a power inverter. The energy storage system may be an energy storage system connected to a smart grid. The energy storage system may serve to respond to a peak load of an electrical grid by storing an amount of excess power in the electrical grid and starting to discharge when power is needed. Accordingly, the energy storage system performs charging and discharging repeatedly in response to an energy demand amount of the electrical grid. Particularly, because the energy demand of the electrical grid is quite variable over time, it is difficult to estimate which point in time the energy storage system will start to charge or discharge to store excess power or provide necessary power to the electrical grid. Therefore, the energy storage system needs a secondary battery charge amount maintenance apparatus and method for maintaining a proper charge amount of a secondary battery so that it may be ready to charge or discharge at any time.

The method for maintaining the charge amount of the secondary battery according to the present disclosure is a method which maintains the charge amount of the secondary battery using the apparatus 100 for maintaining the charge amount of the secondary battery. Accordingly, because the method according to the present disclosure corresponds to the apparatus invention described in the foregoing, a repeated description is omitted herein.

According to the present disclosure, the secondary battery may maintain a proper charge amount in a changing external environment, in particular, an environment in which charging and discharging changes frequently. Accordingly, the secondary battery may hold an available charge capacity and an available discharge capacity by maintaining the charge amount properly. Further, the energy storage system connected to the electrical grid may react to a charge or discharge situation on a peak load in the electrical grid more flexibly.

Meanwhile, in the description of the present disclosure, it should be understood that each element or component of the present disclosure shown in FIG. 6 is distinguished logically rather than physically.

That is, each element or component corresponds to a logic element or component to realize the technical spirit of the present disclosure, and accordingly, it should be understood that even though each element or component is integrated or separated, it falls within the scope of the present disclosure if a function performed by a logic element or component of the present disclosure can be implemented, and it falls within the scope of the present disclosure regardless of whether names are identical or not if it is an element or component performing an identical or similar function.

Also, in the description of the embodiments of the present disclosure, for convenience of understanding, the description has been provided based on an embodiment in which only one dependent configuration is added, an embodiment in which a combination of at least two dependent configurations is added may be contemplated. Accordingly, the scope of the present disclosure is not limited to the exemplary embodiments disclosed herein.

While the present disclosure has been described hereinabove by the specific embodiments and drawings, the present disclosure is not limited thereby, and it will become apparent to those skilled in the art that various changes and modifications may be made within the spirit of the present disclosure and the scope of the appended claims and equivalents thereto.

DESCRIPTION OF REFERENCE NUMERALS

100: Apparatus for maintaining a charge amount of a secondary battery
101: Voltage measurement sensor
102: Current measurement sensor
103: Control unit
104: Memory unit
105: Secondary battery

What is claimed is:

1. An apparatus for maintaining a charge amount of a secondary battery, the apparatus comprising:
   a sensing unit to measure an electrical characteristic value of the secondary battery;
   a memory unit to store a charged power amount decrease section and a charged power amount increase section based on the electrical characteristic value of the secondary battery; and a control unit to output a control signal for reducing an amount of power charged in the secondary battery when a state of the secondary battery corresponds to the charged power amount decrease section based on the electrical characteristic value measured by the sensing unit, and to output a control signal for increasing an amount of power charged in the secondary battery when the state of the secondary battery corresponds to the charged power amount increase section based on the electrical characteristic value measured by the unit, wherein the charged power amount decrease section is a section where the amount of power charged in the secondary battery is beyond a required charge amount maintenance section, wherein the charged power amount increase section is a section where the amount of power charged in the secondary battery is below the required charge amount maintenance section, and wherein when the state of the secondary battery corresponds to the required charge amount maintenance section, the control unit calculates an amount of discharging power of the secondary battery using the electrical characteristic value of the secondary battery measured by the sensing unit during discharging of the secondary battery, and outputs a control signal for charging the secondary battery by an amount of charging power obtained as a result of adding an amount of power compensation to the calculated amount of discharging power when charging the secondary battery.

2. The apparatus for maintaining the charge amount of the secondary battery according to claim 1, wherein the sensing unit corresponds to a voltage measurement sensor.

3. The apparatus for maintaining the charge amount of the secondary battery according to claim 2, wherein the charged power amount decrease section and the charged power amount increase section are set based on a voltage value of the secondary battery.

4. The apparatus for maintaining the charge amount of the secondary battery according to claim 2, wherein the sensing unit further includes a current measurement sensor.

5. The apparatus for maintaining the charge amount of the secondary battery according to claim 4, wherein the charged power amount decrease section and the charged power amount increase section are set based on a state of charge (SOC) of the secondary battery.

6. The apparatus for maintaining the charge amount of the secondary battery according to claim 1, wherein the control signal for reducing the amount of power charged in the secondary battery is a signal for reducing an amount of charging power supplied to the secondary battery.

7. The apparatus for maintaining the charge amount of the secondary battery according to claim 1, wherein the control signal for reducing the amount of power charged in the secondary battery is a signal for increasing an amount of discharging power outputted from the secondary battery.

8. The apparatus for maintaining the charge amount of the secondary battery according to claim 1, wherein the control signal for reducing the amount of power charged in the secondary battery is a signal for reducing an amount of charging power supplied to the secondary battery and increasing an amount of discharging power outputted from the secondary battery.

9. The apparatus for maintaining the charge amount of the secondary battery according to claim 1, wherein the control signal for increasing the amount of power charged in the secondary battery is a signal for reducing an amount of discharging power outputted from the secondary battery.

10. The apparatus for maintaining the charge amount of the secondary battery according to claim 1, wherein the control signal for increasing the amount of power charged in the secondary battery is a signal for increasing an amount of charging power supplied to the secondary battery.

11. The apparatus for maintaining the charge amount of the secondary battery according to claim 1, wherein the control signal for increasing the amount of power charged in the secondary battery is a signal for reducing an amount of discharging power outputted from the secondary battery and increasing an amount of charging power supplied to the secondary battery.

12. The apparatus for maintaining the charge amount of the secondary battery according to claim 1, wherein the memory unit further stores a charging stop section where the amount of power charged in the secondary battery represents a larger amount of power than the charged power amount decrease section, and the control unit outputs a control signal for stopping the charge of the secondary battery when the state of the secondary battery corresponds to the charging stop section based on the electrical characteristic value measured by the sensing unit.

13. The apparatus for maintaining the charge amount of the secondary battery according to claim 1, wherein the memory unit further stores a discharging stop section where the amount of power charged in the secondary battery represents a smaller amount of power than the charged power amount increase section, and the control unit outputs a control signal for stopping the discharge of the secondary battery when the state of the secondary battery corresponds to the discharging stop section based on the electrical characteristic value measured by the sensing unit.

14. An energy storage system comprising:
a plurality of secondary batteries;
an apparatus for maintaining a charge amount of a secondary battery according to claim 1; and
a power inverter unit to provide a charging power to the secondary battery or provide a discharging power from the secondary battery to an external power source, in response to a control signal outputted from the control unit included in the apparatus for maintaining the charge amount of the secondary battery.

15. A method for maintaining a charge amount of a secondary battery through an apparatus for maintaining the charge amount of the secondary battery including a sensing unit to measure an electrical characteristic value of the secondary battery, a memory unit to store a charged power amount decrease section and a charged power amount increase section based on the electrical characteristic value of the secondary battery, and a control unit to output a control signal for reducing or increasing an amount of power charged in the secondary battery, the method comprising:

(a) receiving, by the control unit, a signal for the electrical characteristic value of the secondary battery from the sensing unit;

(b) determining, by the control unit, whether a state of the secondary battery corresponds to the charged power amount decrease section or the charged power amount increase section based on the electrical characteristic value of the secondary battery; and (c) outputting, by the control unit, a control signal for reducing the amount of power charged in the secondary battery when the state of the secondary battery corresponds to the charged power amount decrease section, and outputting a control signal for increasing the amount of power charged in the secondary battery when the state of the secondary battery corresponds to the charged power amount increase section, wherein the charged power amount decrease section is a section where the amount of power charged in the secondary battery is beyond a required charge amount maintenance section, wherein the charged power amount increase section is a section where the amount of power charged in the secondary battery is below the required charge amount maintenance section, wherein the step (b) comprises further determining, by the control unit, whether the state of the secondary battery corresponds to the required charge amount maintenance section based on the electrical characteristic value measured by the sensing unit, and wherein the step (c) further comprises calculating, by the control unit, an amount of discharging power of the secondary battery using the electrical characteristic value of the secondary battery measured by the sensing unit during discharging of the secondary battery when the state of the secondary battery corresponds to the required charge amount maintenance section, and outputting a control signal for charging the secondary battery by an amount of charging power obtained as a result of adding an amount of power compensation to the calculated amount of discharging power during charging of the secondary battery.

* * * * *